United States Patent [19]

Thiac

[11] Patent Number: 5,011,327
[45] Date of Patent: Apr. 30, 1991

[54] EROSION BARRIER

[76] Inventor: E. Brandt Thiac, 10920 Airline Hwy., Apt 141, Baton Rouge, La. 70816

[21] Appl. No.: 538,616

[22] Filed: Jun. 15, 1990

[51] Int. Cl.$^5$ .............................................. E02B 3/06
[52] U.S. Cl. ......................................... 405/28; 405/30
[58] Field of Search .................. 405/15, 16, 19, 21, 405/25, 27, 28, 30, 31, 33, 34, 35, 258, 284

[56] References Cited

U.S. PATENT DOCUMENTS

| | | | |
|---|---|---|---|
| 3,214,916 | 11/1965 | Martin | 405/28 |
| 3,276,210 | 10/1966 | Stitt | 405/27 |
| 3,842,606 | 10/1974 | Stiles et al. | 405/19 |
| 3,928,701 | 12/1975 | Roehner | 428/222 |
| 4,022,434 | 5/1977 | Moore | 256/1 |
| 4,080,793 | 3/1978 | Pulsifer | 405/30 |
| 4,139,319 | 2/1979 | Anderson | 405/16 |
| 4,150,909 | 4/1979 | Hibarger et al. | 405/27 |
| 4,186,913 | 2/1980 | Bruner et al. | 256/13.1 |
| 4,188,153 | 2/1980 | Taylor | 405/34 |
| 4,196,694 | 4/1980 | Buchanan | 119/3 |
| 4,362,432 | 12/1982 | Conover | 405/33 |
| 4,785,577 | 11/1988 | Lederbauer | 405/284 X |
| 4,824,286 | 4/1989 | Waas | 405/30 X |

FOREIGN PATENT DOCUMENTS

| | | | |
|---|---|---|---|
| 1285739 | 1/1962 | France | 405/21 |
| 55326 | 6/1935 | Norway | 405/21 |
| 1312130 | 5/1987 | U.S.S.R. | 405/21 |

Primary Examiner—David H. Corbin
Attorney, Agent, or Firm—A. Robert Theibault

[57] ABSTRACT

This apparatus is directed to an erosion barrier for use with a shoreline of tidal water having a flood and ebb phase in each tidal cycle in which a first tire barrier has a plurality of vertically stacked tiers of tires cut in half and positioned side by side in rows and the rows arranged in stacked tiers staggered and each tier connected to the tier immediately therebeneath. The half tires are positioned with their rounded tread positioned toward the tidal source and their open portion toward the shoreline to receive soil and sand during the ebb phase of the tidal cycle and form a tire revetment. A second barrier is spaced from the first barrier and has a plurality of horizontally disposed vertically pivoted slats positioned to unseat with the flood phase of the tidal cycle and permit water, soil and sand to pass therethrough but upon cycle change to ebb the slats will close stopping tidal flow to permit the soil and sand time to settle out to form land about the barriers before tidal cycle change. This cyclical action of the tide and barriers will form a shoreline revetment to counteract shoreline erosion action.

7 Claims, 6 Drawing Sheets

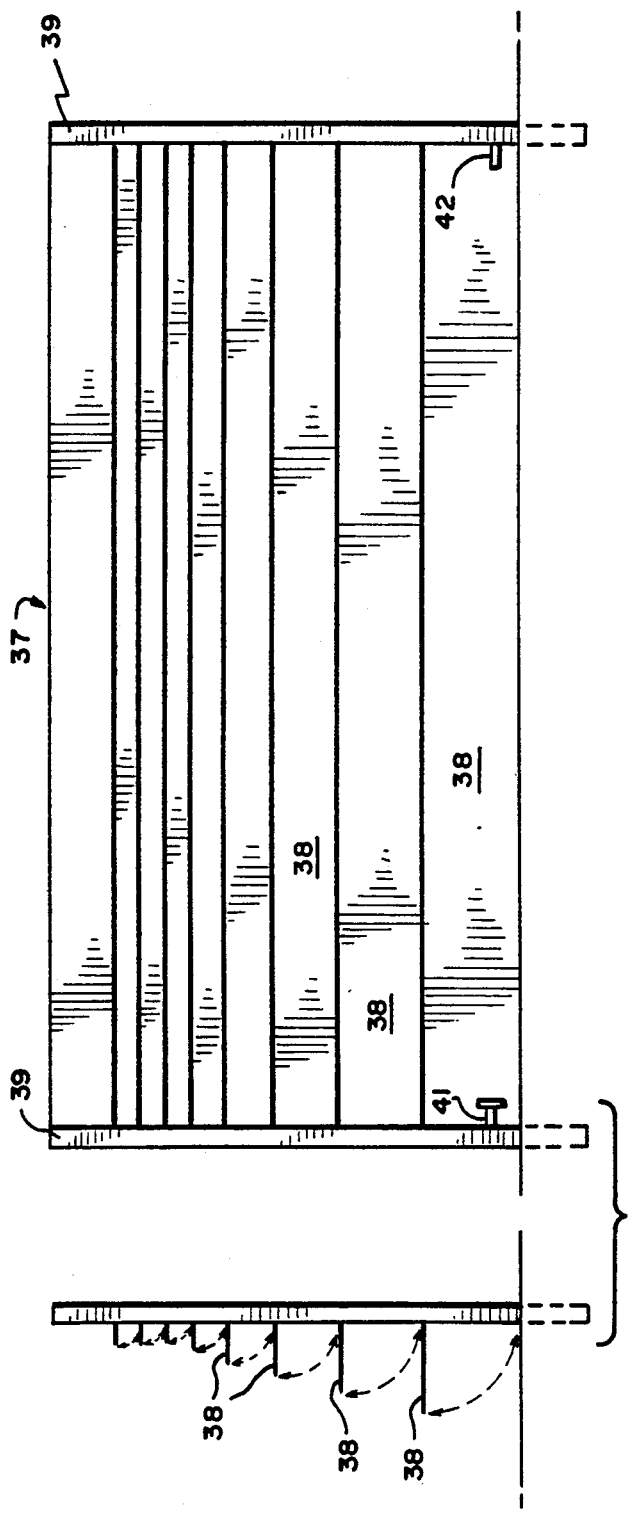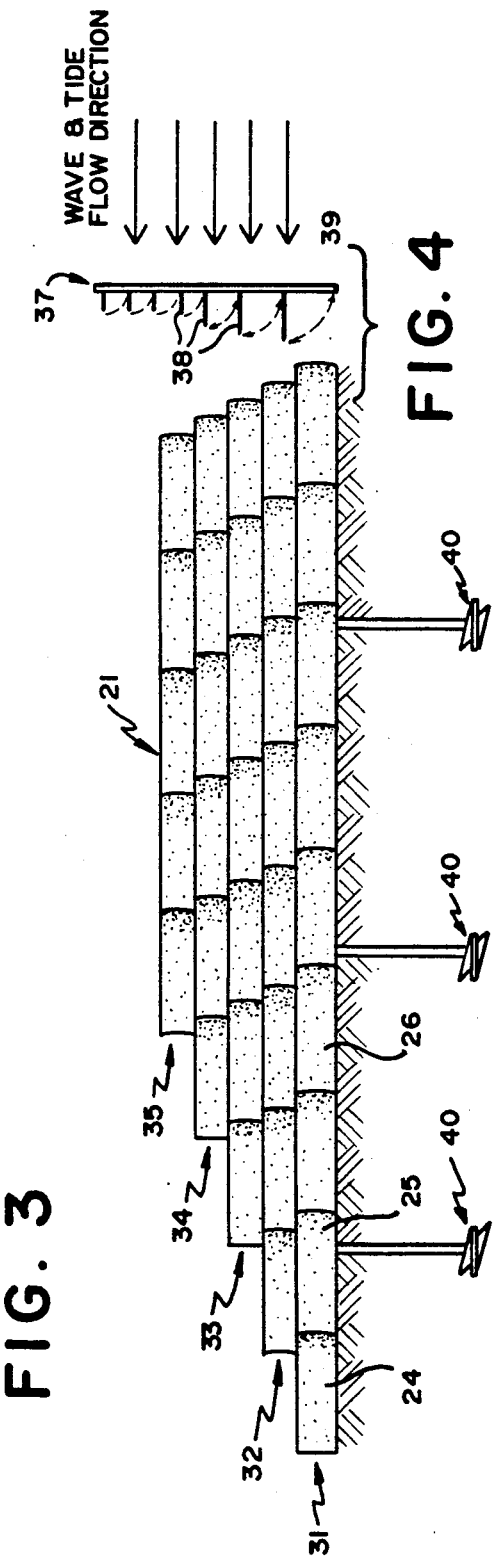

EROSION BARRIER

TECHNICAL FIELD

My invention relates to shore-line or beach protectors of the barrier type which retard the washing of sand and soil to the tidal water whether it be a river, bay or ocean and is of the revetment or barrier type made up of old vehicle pneumatic tires cut in half and arranged in tiers to form revetments which cooperate with louvered barriers spaced tidally of the tire revetment to provide a settling zone for soil or sand to settle out and form land.

1. Background Art

Heretofore many forms of revetments made up of old pneumatic vehicle tires have been proposed. The closest art known to me prior to this application are: the patent to WADE STILES, U.S. Pat. No. 3,842,606; ERNEST K. PULSIFER U.S. Pat. No. 4,080,793 and U.S. Pat. No. 4,188,153 to JOHN E. TAYLOR.

2. Disclosure of the Invention

The present invention is directed to the use of pneumatic tires, new or used, and/or any objects of similar size and shape, cut in half or parts thereof which may be used as a revetment barrier in combination with a louvered barrier spaced from the tire barrier in the direction of the tidal source, to stop shoreline erosion and to rebuild eroded areas. The wave or tidal action is shown as perpendicular to the shore; however, the invention will work equally as well with the tidal wave action coming from the left or right of perpendicular to the shore line. The height of the stacked tire barrier and louvered barrier, will be covered at high tide. The top of the barrier will be approximately 6" to 12" below the water line at high tide. The structure is so designed that should hurricane forces hit the tire revetment barrier it will remain anchored and when these forces subside the tidal wave action will automatically begin to rebuild what ever top soil was lost. A principle of my invention is that as water is moved over the tires it meets little resistance due to the rounded part of the tires facing the tidal source. The surge of water moves toward and to the beach or waters edge. The distance between the beach and water's edge to the outside perimeter will be governed by the tidal wave action. When the water starts to recede it is caught in the open edges of the tires. The tiers of tires are so stacked that each tire automatically pours water and solids toward the center opening made by the semicircular tires. (see stippled areas). The tire ends are positioned in the middle on top of the tires on the next lower tier and the tiers are stacked.

A louvered barrier is placed seawardly on the tire barrier revetment or levee. The slats of the louvered barrier are pushed open by the surge of water toward the shore. Each slat is pivoted to work independently of each other slat. As the solids build up from the bottom slats they are immobilized retaining the solids. The slats automatically close when there is no pressure exerted from the tidal source. The slats further retard the outward flow of water allowing additional time for solids to settle to the bottom of the barrier or the levee. The tires are stacked in a step-like tiered formation. This is one configuration, however the tires may also be stacked to form a wall at the shoreline. Using this method, with tires as a foundation, and the surge retardant to operate the slat mechanism, barrier islands may be constructed in deep water.

A revetment constructed of tires as herein described may also be used on the ocean floor to protect marine pipe lines from destruction by hurricane winds and currents.

BRIEF DESCRIPTION OF DRAWINGS

FIG. 3, is a front elevational view of a louvered barrier employed with the tiered semi-tired barrier of the present invention.

FIG. 4, is a side elevational view of one form of the tire revetment of the present invention employing in combination therewith the louvered barrier of FIG. 3.

BEST MODE FOR CARRYING OUT THE INVENTION

Figure 1:
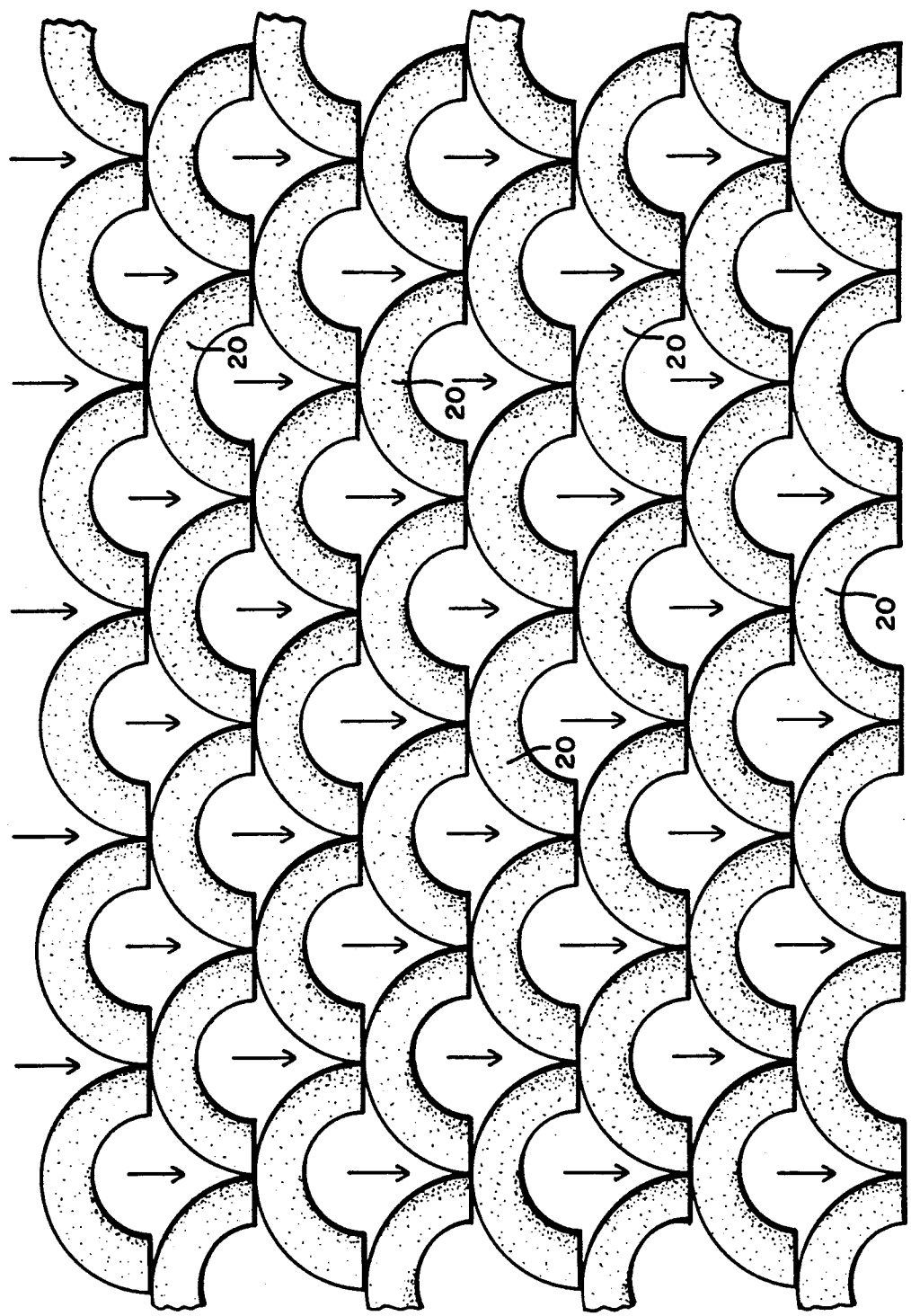
FIG. 1, is a top plan schematic view of a plurality of lines of pneumatic tires cut in half and connected adjacently to form lines of tires arranged in staggered or off set tiers.

Referring now to the drawings and for the moment to FIGS. 1 through 4, 20 designates pneumatic tires, new or used which have been cut in half transversely to their radial circumference. FIG. 1 shows a typical tier level section and the arrows represent the wave or tidal action as being perpendicular to the shore; however, the revetment barrier 21, FIG. 4, will work equally as well with the tidal action coming from the left or right of perpendicular to the shoreline.

Figure 6:
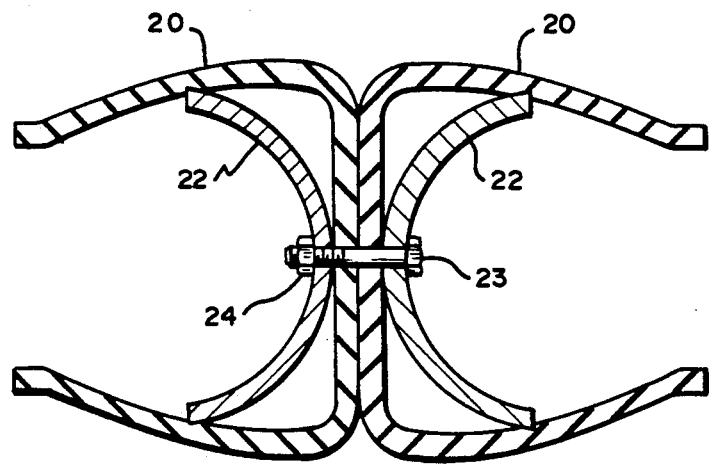
FIG. 6, is a vertical sectional view of a joint between two lines of semi-tires having spreaders installed therein employed with the present invention.
Figure 7:
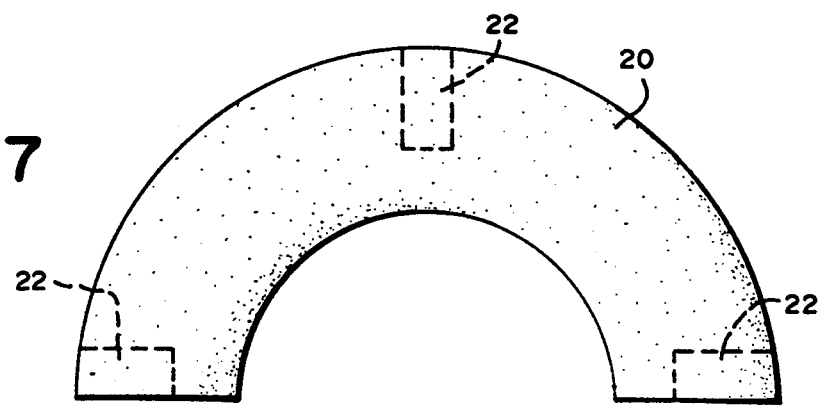
FIG. 7, is a top plan view of a semi-tire having three spreaders of the type shown in FIG. 6 installed.
Figure 11:
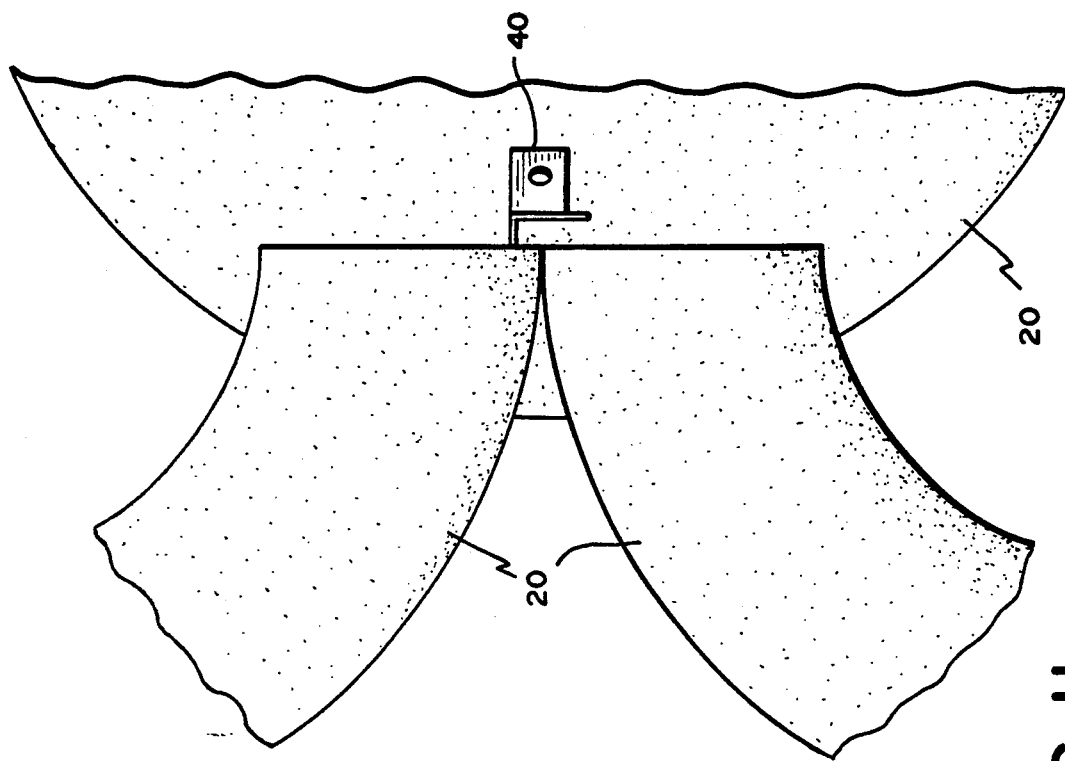
FIG. 11, is a top plan view of FIG. 10.
Figure 10:
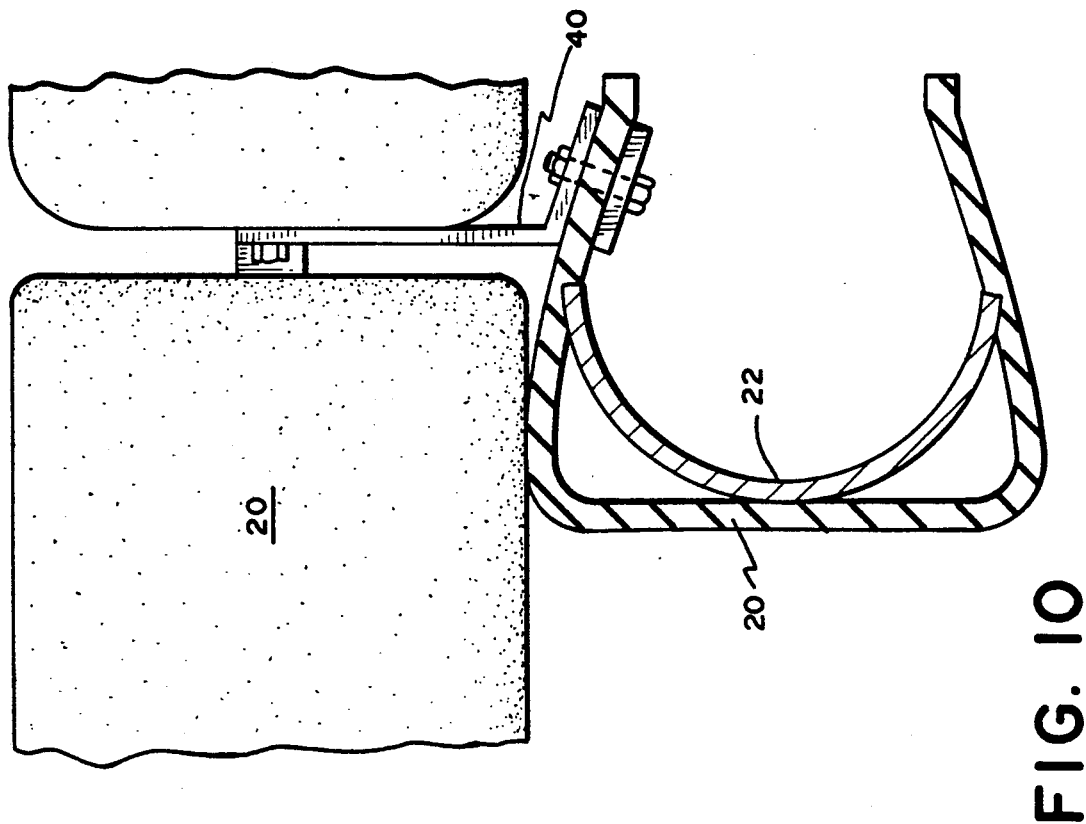
FIG. 10, is a side elevational view of the strap connection between two lines of tires of a tier and the connection with an immediately below tier in accordance with the present invention.

The height of the tire revetment 21 of stacked tires will be covered by water at high tide. The top of the stack will be approximately 6" to 12" below the water line at high tide. As shown in FIG. 4, the tire barrier 21 is composed of lines 22 of adjacent semi-tires 20 secured to one another, as shown in FIG. 6, wherein semi-circular portions of plastic conduit or metal 22 are employed as spreaders to keep the tires open to receive soil, sand and water. The adjacent tires 20 are bolted together with bolts and nuts 23, 24 to form a line of tires 25. The lines of tires 24, 25, 26, form a tier of half tires and a plurality of tiers of tires are disposed vertically as at 31, 32, 33, 34 and 35 as shown in FIG. 4. The tires may be connected by straps 36 as shown in FIGS. 10 and 11.

Seawardly of the tire barrier revetment 21 is a louvered barrier 37 of wood, plastic or metal having vertically disposed horizontally pivoted slats 38 best seen in FIGS. 3 and 4. The slatted barrier 37 is spaced from the tire barrier revetment.

The tire barrier or revetment 21 may be retained in place on the beach by anchor screws 40 structurally interconnected with at least some of the sand and water ballast filled semitire casings 20 and disposed within the mass of more consolidated earth therebelow to effectively anchor the array or tier revetment 21 to a predetermined location.

Positioned seawardly of the tire barrier revetment 21 is a louvered barrier 37 of wood, plastic or metal, having vertically positioned slats 38 horizontally pivoted to stand posts 39 to permit the slats 38 to pivot upwardly as shown at the left hand end of FIG. 3 to permit the flood water during the flood phase of the tidal cycle to pass the barrier 37 and flow on to and about the tire revetment 21.

When the ebb phase of the tidal cycle comes about and the water and entrapped soil and sand move toward the tidal source the water flow will cause the slats 38 to seat and form a quiet pool so that the soil and sand may settle out and earth may be built up around the revetment 21.

The problem of controlling and limiting erosion of earthwater interfaces is an environmental problem having also the problem of disposal of used vehicular tire casings which is discussed at length in U.S. Pat. No. 4,080,793. The present invention is also a solution to both problems.

Figure 2:
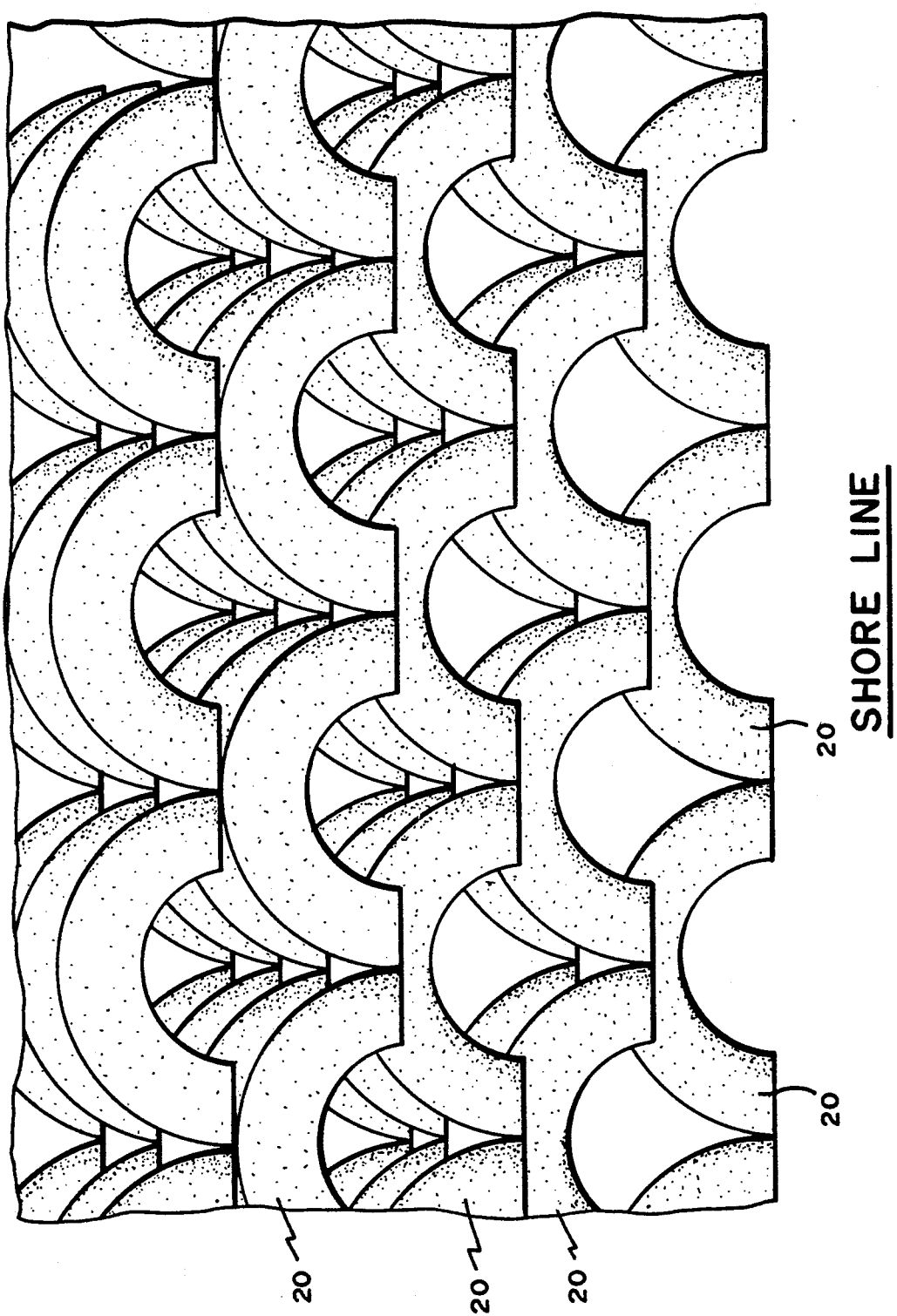
FIG. 2, is a top plan schematic view of a tiered revetment of tires of FIG. 1, mounted to form a tire barrier to retard tidal erosion.
Figure 5:
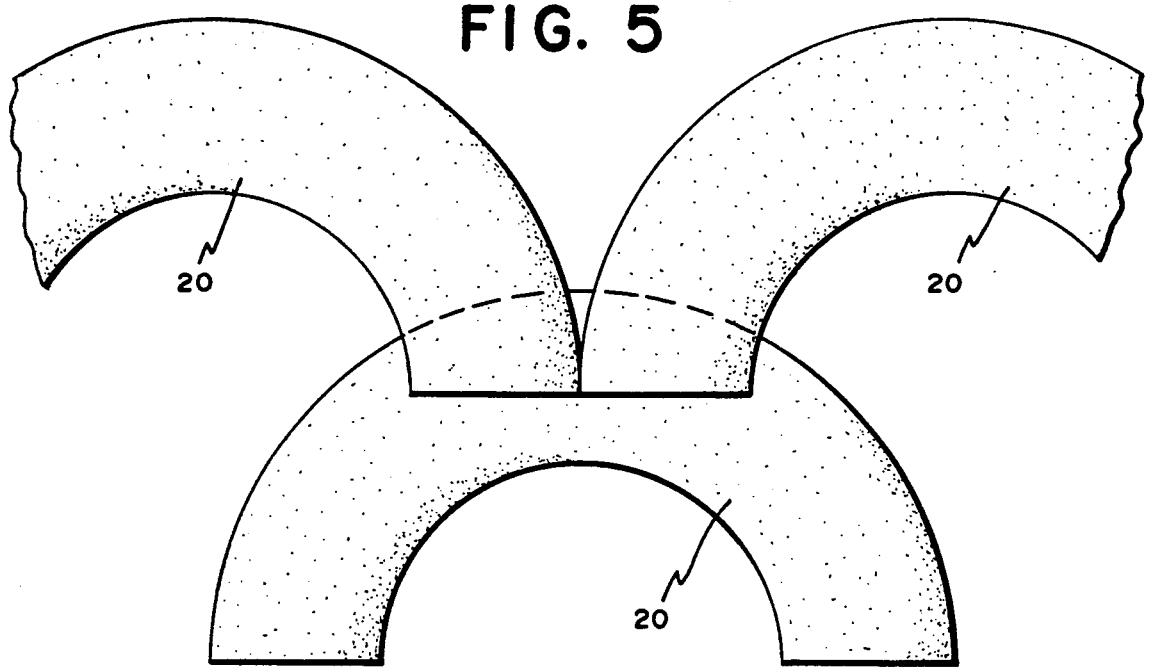
FIG. 5, is a top plan schematic view of two lines of semi-tires positioned in over lapping relation.
Figure 9:
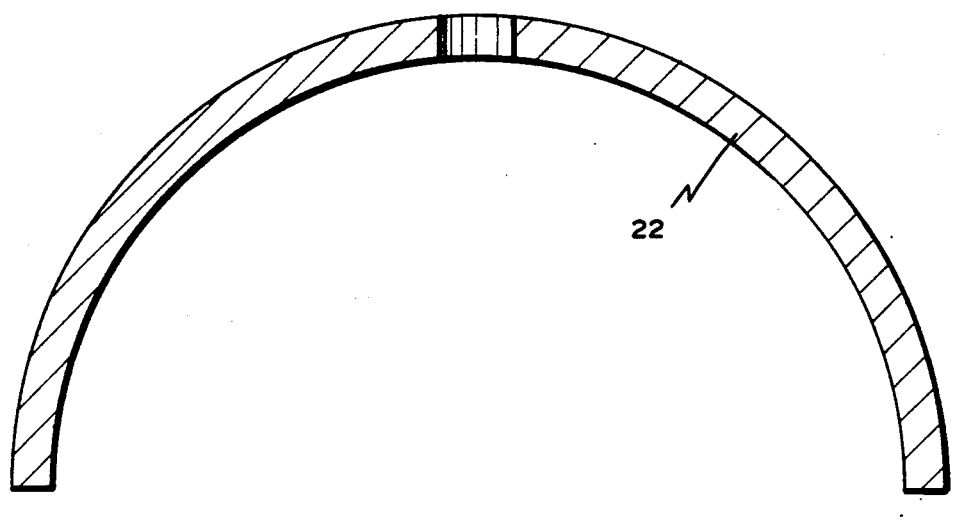
FIG. 9, is a vertical sectional view taken through the spreader of FIG. 8.
Figure 8:
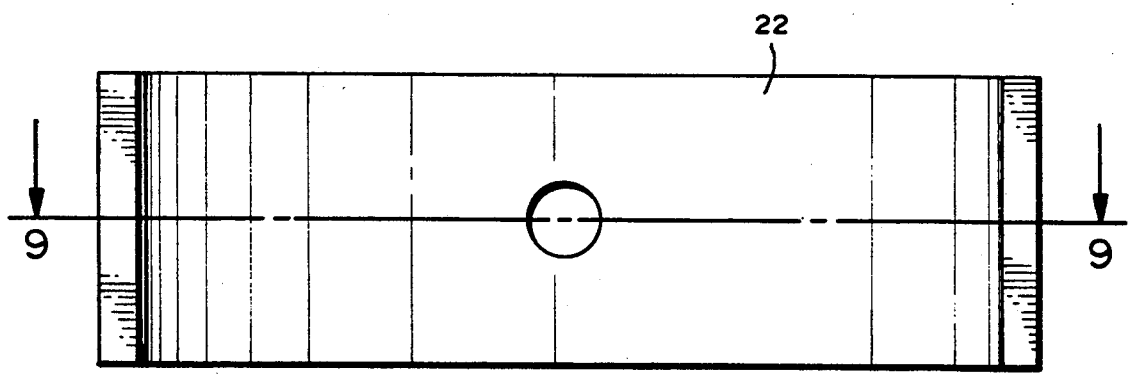
FIG. 8, is a bottom plan view of a plastic PVC spreader employed with the tires of the present invention.

As shown in FIGS. 8 and 9 the spreaders 22 also perform as reinforcing connectors for joining adjacent tires in a line as well as joining tiers of lines of tires as in FIGS. 2, 3 and 6.

As shown in FIGS. 10 and 11 the tiers and lines of tires may be maintained in their proper positions in over lapping relationship by straps 40.

Bolts 41 or dowels 42 carried by the posts 39 are limit stops to permit the louvered slats 38 to pivot inwardly toward the tire revetment 21 during the flood phase of the tide, but to arrest their movement toward the tidal source on ebb flow to form a barrier wall for water to form a settling pool for sand soil to settle and build up land about both the tire revetment 21 and the louvered barrier 37.

When the shore line has been re-established to an acceptable level the louvered barrier 37 may be removed to make the surf more accessable and visually pleasant to swimmers and beach users and should subsequent erosion require it the louvered barrier may be reinstalled to build up the shore-line.

What I claim is:

1. For use with the shoreline of tidal water, an erosion barrier comprising a first barrier of a plurality of vertically stacked tiers of pneumatic tires cut in half and joined at their severed ends by bolt and nut connections, each tier of tires being staggered with each other tier above and below it, the tires being laid on their sides and joined to adjacent half tires at their abutting ends to form a tire line, said tire lines being vertically stacked tier upon tier in staggered overlying relationship, each half tire having arcuate spreader-connectors located one at at least each end and one intermediate the two ends, the spreaders of one line being joined to the spreaders of an adjacent line of a tier of tires by a bolt and nut connection, bracket connectors join the vertically adjacent line of interconnected tires of two lines of tires of a tier of tires through a bolted connection, strap connections joining the lines of interconnected tires between tiers of vertically stacked staggered lines of tires to form the tire barrier revetment, and a second barrier of the louvered type placed about 20-25 feet from the tire revetment, in the direction of tidal origin with the louvers being pivotally mounted vertically on the louvered barrier to unseat in the direction of inward or flood flow of tidal water and to seat against the barrier and with the ebb of tidal water to cause the louvers to remain closed to allow solids carried by the ebb water to build up and form with the tire barrier revetment an anti-erosion levee.

2. The method of constructing an erosion barrier comprising the steps of forming a first tire barrier revetment of half tires joined by bolted connections and spreaders to keep the interior of the tires open to trap sand and soil eroded by tidal flow and arranging lines of connected tires in staggered tiers to form a stepped barrier revetment and positioning a second barrier having horizontally pivoted louvers constructed to unseat with the influx of tide and to seat with the ebb of tide to build up a barrier of sand and soil together with the louvers arresting shore erosion due to flooding and ebbing of the tide.

3. An erosion barrier as claimed in claim 1, wherein both the tire barrier revetment and louvered barrier remain in place once erected to retain soil and sand eroded by the tidal current of flood and ebb.

4. For use with a shore line of tidal water, having a flood and ebb phase in each tidal cycle, an erosion barrier comprising a first barrier of a plurality of vertically stacked tiers of lines of pneumatic tires cut in half and joined at their cut ends to form lines of adjacently connected half tires with their tread portion positioned toward the tide and their open portion directed toward the shore line, the tire lines being vertically stacked tier upon tier in a staggered over-lying relationship to one another to form said first barrier, spreader means in each half tire to keep the tire open to trap sand and soil conveyed by the tidal water, strap means connecting lines of the connected tires in tiered staggered overlying relationship to form said first barrier, a second barrier spacedly positioned from said first barrier toward the tidal source, vertically disposed horizontally pivoted louvers on said second barrier to permit passage of the tidal water toward said first barrier on the flood phase of the tidal cycle and to stop the flow of ebb water with its entrained soil and sand to permit settling of the soil and sand on the ebb phase of the cycle to build up with said first tired barrier forming a revetment of earth and tires to retard erosion.

5. An erosion barrier as claimed in claim 4 wherein said louvered second barrier is spaced 20 to 25 feet from said first barrier toward the tidal direction.

6. An erosion barrier as claimed in claim 1 wherein said spreader means also forms a connector means between tires of a line of tires and tiers of tires forming a multi-tiered barrier.

7. The method of constructing an erosion barrier as claimed in claim 2 further comprising the step of removing the second barrier of horizontally pivoted louvers upon establishing a desired restoration of the shoreline.

* * * * *